(12) United States Patent
Lacaze et al.

(10) Patent No.: US 10,324,476 B2
(45) Date of Patent: Jun. 18, 2019

(54) ROBOTIC SWARM LOCALIZATION USING RANGING RADIOS

(71) Applicants: Alberto Daniel Lacaze, Potomac, MD (US); Karl Nicholas Murphy, Rockville, MD (US); Joseph Putney, Waterford, VA (US); Anne Rachel Schneider, Gaithersburg, MD (US)

(72) Inventors: Alberto Daniel Lacaze, Potomac, MD (US); Karl Nicholas Murphy, Rockville, MD (US); Joseph Putney, Waterford, VA (US); Anne Rachel Schneider, Gaithersburg, MD (US)

(73) Assignee: Robotic Research, LLC, Gaithersburg, MD (US)

( * ) Notice: Subject to any disclaimer, the term of this patent is extended or adjusted under 35 U.S.C. 154(b) by 104 days.

(21) Appl. No.: 14/874,078

(22) Filed: Oct. 2, 2015

(65) Prior Publication Data
US 2016/0114487 A1 Apr. 28, 2016

Related U.S. Application Data

(60) Provisional application No. 62/059,124, filed on Oct. 2, 2014.

(51) Int. Cl.
| | |
|---|---|
| *G05D 1/10* | (2006.01) |
| *G01S 5/02* | (2010.01) |
| *B25J 9/16* | (2006.01) |
| *B64C 39/02* | (2006.01) |
| *G01S 17/08* | (2006.01) |
| *G01S 17/93* | (2006.01) |

(52) U.S. Cl.
CPC ............ *G05D 1/104* (2013.01); *B25J 9/1617* (2013.01); *B64C 39/024* (2013.01); *G01S 5/0289* (2013.01); *B64C 2201/123* (2013.01); *B64C 2201/143* (2013.01); *G01S 17/08* (2013.01); *G01S 17/933* (2013.01); *G05B 2219/39146* (2013.01); *Y10S 901/01* (2013.01)

(58) Field of Classification Search
CPC ...... G01S 5/0289; G01S 17/933; G01S 17/08; G05D 1/0291; G05D 1/104; G05D 1/0278; G05D 2201/0207; G05D 1/0272; G05D 1/0027; Y10S 901/01; G05B 2219/33192; G05B 2219/39168; G05B 2219/39146; G01C 21/3438; B25J 9/1617; B64C 39/024; B64C 2201/143; B64C 2201/123
See application file for complete search history.

(56) References Cited

U.S. PATENT DOCUMENTS

| | | | |
|---|---|---|---|
| 6,687,571 B1* | 2/2004 | Byrne | G05D 1/0289 700/225 |
| 2003/0028286 A1* | 2/2003 | Glenn | B25J 9/1689 700/245 |
| 2003/0212472 A1* | 11/2003 | McKee | G05D 1/0274 700/245 |

(Continued)

*Primary Examiner* — Jason Holloway
(74) *Attorney, Agent, or Firm* — White-Welker & Welker, LLC; Matthew T. Welker, Esq.

(57) ABSTRACT

A system for localizing a swarm of robotic platforms utilizing ranging sensors. The swarm is localized by purposely leaving some of the platforms of the swarm stationary, providing localization to the moving ones. The platforms in the swarm can alternate between a stationary and moving state.

13 Claims, 5 Drawing Sheets

(56) References Cited

U.S. PATENT DOCUMENTS

| | | | |
|---|---|---|---|
| 2004/0024490 A1* | 2/2004 | McLurkin | G05D 1/0297 700/245 |
| 2005/0183569 A1* | 8/2005 | Solomon | B64C 39/024 89/1.11 |
| 2006/0161405 A1* | 7/2006 | Munirajan | G06N 3/008 703/6 |
| 2012/0158176 A1* | 6/2012 | Park | B25J 5/007 700/248 |
| 2013/0123981 A1* | 5/2013 | Lee | H04W 4/02 700/248 |
| 2017/0057081 A1* | 3/2017 | Krohne | B25J 9/0084 |

* cited by examiner

ROBOTIC SWARM LOCALIZATION USING RANGING RADIOS

CROSS REFERENCE TO RELATED APPLICATIONS

This application claims priority from U.S. Patent Application Ser. No. 62/059,124, entitled "Robotic Swarm Localization Using Ranging Radios", filed on 2 Oct. 2014. The benefit under 35 USC § 119(e) of the United States provisional application is hereby claimed, and the aforementioned application is hereby incorporated herein by reference.

FEDERALLY SPONSORED RESEARCH

Not Applicable

SEQUENCE LISTING OR PROGRAM

Not Applicable

TECHNICAL FIELD OF THE INVENTION

The present invention relates generally to the autonomous control of small robotic platforms. More specifically, the present invention relates to robotic localization.

BACKGROUND OF THE INVENTION

There are several challenges related to the autonomous control of small robotic platforms. The small payload and usually low cost restrict them from carrying accurate, inertial localization systems. Therefore, in GPS denied areas, automatic tasks—like mapping and searching—become a challenge.

Several technologies have been developed to overcome these challenges. Visual odometry and LADAR odometry are commonly used to complement the higher drift of the inertial components, aiding in localization. The problem with these techniques is that they are brittle in some environments; in particular, tunnels, caves, and man-made structures pose some challenges. Poor lighting conditions, low quality cameras, and dusty or smoky conditions further exacerbate the localization errors. For example, state-of-the-art quadrotors equipped with quality cameras, flying in a sufficiently-lit tunnel, while using visual odometry, may achieve 5% to 10% error as a function of distance travelled. This error becomes 10% to 25% of distance travelled if the quad-rotor must carry its own illumination. If the tunnel is dusty or smoky, the error in localization is driven by the inertial components.

The inertial components of the navigation unit are composed of accelerometers and gyroscopes. The position is computed by double integrating the acceleration. Therefore, small bias errors in acceleration become exponential errors in position. If the visual or LADAR odometry is blocked by smoke or dust, and no longer seeing features, the position error will grow exponentially. This is due to the double integration errors, and the lack of other sensors contributing to the bias estimates.

The problems with localization become very evident on flying platforms, as they do not have wheel odometry to maintain the inertial biases. In small robotic platforms where the wheel slippage is large, the localization estimates also suffer accordingly.

SUMMARY OF THE INVENTION

The invention provides a mechanism for maintaining the localization of moving platforms, by utilizing stationary platforms, moving platforms, and ranging radios. The stationary platforms help provide localization to the moving platforms. The number of stationary platforms can be increased to provide higher accuracy, or to extend the localization workspace. By alternating stationary and moving platforms, the localization workspace can be accommodated to the task.

Ranging radios often provide a single measurement of range, without providing the direction of the other device. However, there are ranging radios that can provide both range and direction. If this type of ranging radios are used, then a single platform can be left stationary, while the others can move. The ranging radios can be implemented with a variety of technologies, including electromagnetic waves with active or passive responses (i.e. radar), utilizing LADAR, vision against known features in the moving platform, and even acoustic sensors. This localization system can be utilized with a variety of sensors that provide point-to-point measurement between the platforms.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE INVENTION

Figure 1A:
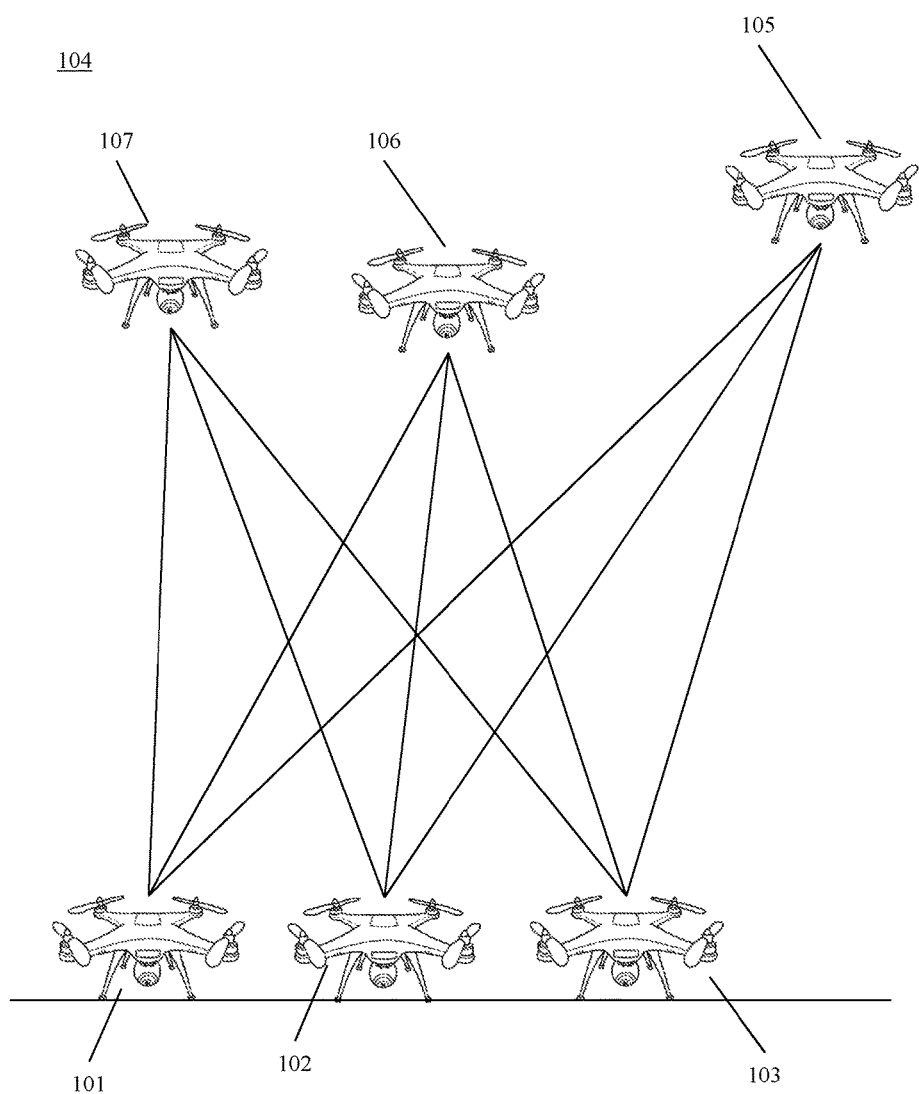
FIGS. 1a, 1b, and 1c illustrate the localization swarm on the fly.

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the apparatus of the present invention.

Ranging radios operating at ultra wide band (UWB) frequencies can provide accurate point-to-point measurements. The accuracy of the range measurements depends on the frequencies used and the radio's design. Commercial, off-the-shelf ranging radios are available utilizing UWB, but there are also ranging radios based on BLUETOOTH, WIFI, and other frequencies and encoding methods. State-of-the-art ranging radios are small in size and low in cost. This makes them prime candidates for installation in small robotic systems.

By installing ranging radios, we can directly measure the distance between the robotic platforms, but they do not provide localization by default. The invention provides a swarm movement methodology for maintaining relative and absolute localization of the group.

As presented earlier, the inertial components 401 of navigation units 402 drift with time 404 as a platform 400 is flying 403. However, when the navigation unit 402 is not moving (i.e. the platform has landed), we are aware that the position is immobile 405; acceleration biases can then be computed 406 (zero velocity update). Moreover, if a sufficient number of platforms 400 are not moving 405, the position of the moving platforms can be computed by triangulating the position of the ones that are stationary 407.

Specifically, let's assume that the position of three quadrotors is known. The quads are on the ground 101, 102, and 103 in a triangular configuration shown in FIG. 1a, 104. There are three other quads 105, 106, and 107 that "leap frog" over the three landed quads 101, 102, and 103. Since the location of all the robots/quads on the ground 101, 102, and 103 is known, and the ranging radios provide ranges 408 from each landed quad 101, 102, and 103 to each flying quad 105, 106, and 107, the location of the three flying quads 105, 106, and 107 is also known. As the flying quads land 409 as shown in FIG. 1b, 108, the location of their landing will be known 410, releasing 411 the originally landed quads 101, 102, and 103 to fly, starting the cycle 412 once again as shown in FIG. 1c, 109.

Figure 1B:
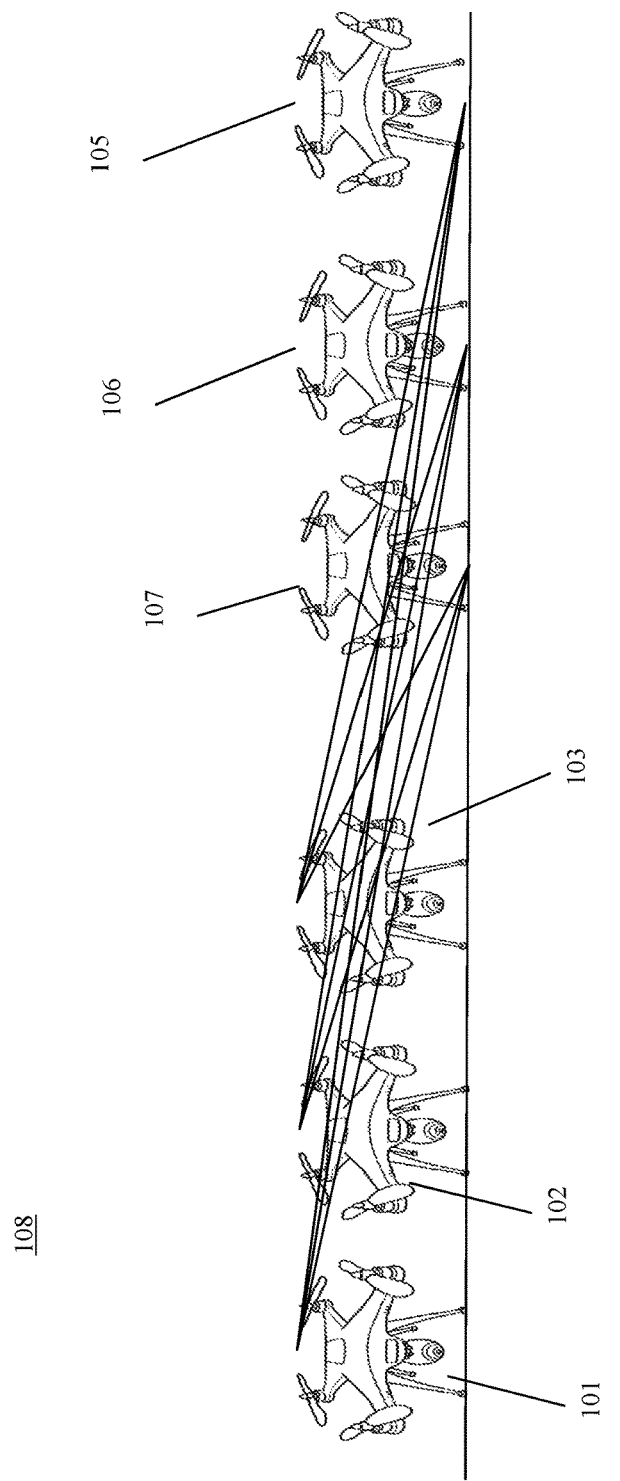
Figure 1C:
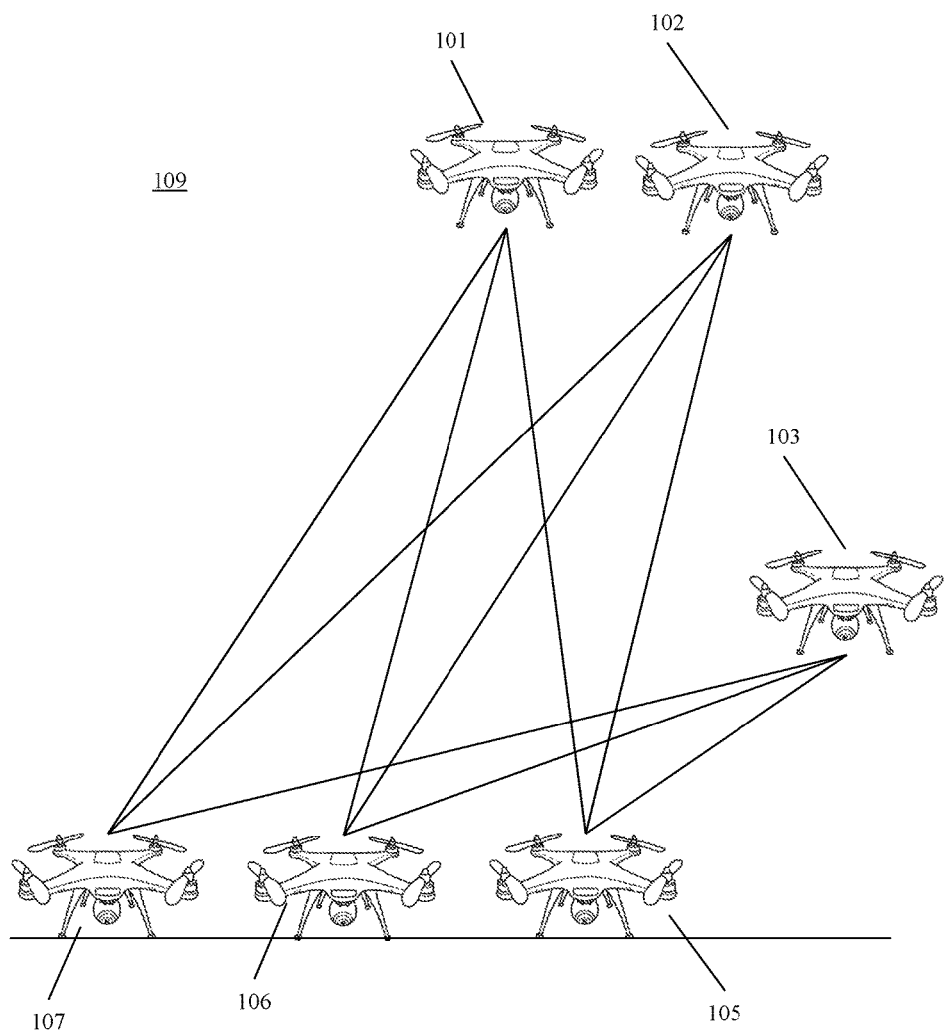

Even though the example of FIGS. 1a-1c shows the quads "leap frogging," the same algorithm can be used with at least three stationary robots, where the flying robots perform other tasks (like mapping the room), leaving the three stationary robots in place, acting as sources of localization.

Figure 2:
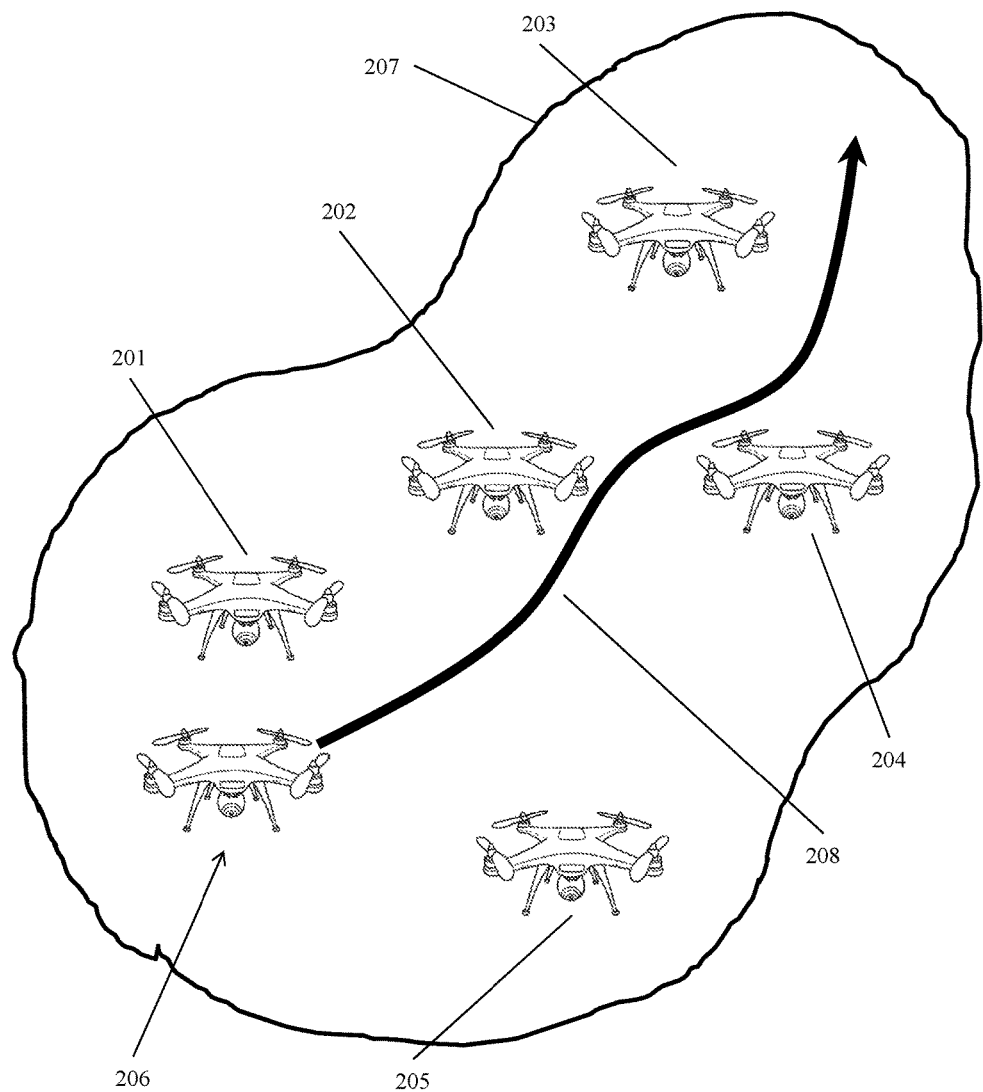
FIG. 2 illustrates a group of quads is maintained stationary on the ground to provide a localization pathway for the fling quads.
Figure 3:
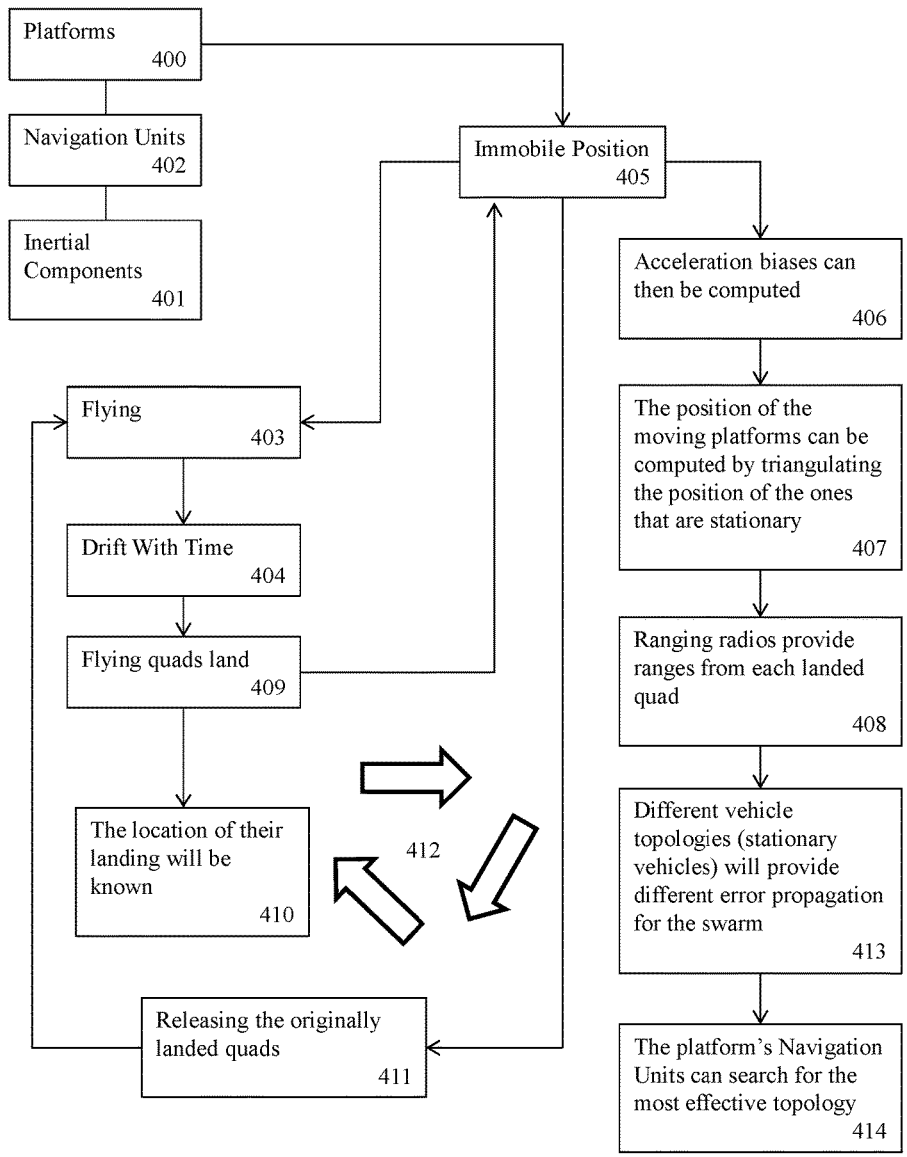
FIG. 3 is a flow/logic diagram of the present invention.

In a similar fashion, more than three robots can be used in a stationary manner to create a localization "carpet" 207 that can provide both localization and communication relay. FIG. 2 shows one such example. In this case, a group of stationary quads 201, 202, 203, 204, and 205 which may be low on battery, are being used to provide localization for the incoming wave of flying quads 206 that are traversing a path 208.

Different vehicle topologies (stationary vehicles) will provide different error propagation for the swarm 413. In order to optimize the topology and therefore minimize the error in localization, the system can search for the most effective topology 414. The literature already presents a variety of optimization algorithms that can be used for this purpose. In particular, a lot of work in this area was conducted in the early 70s and 80s to find the best topology for GPS satellites. In the present incarnation the topology is generated by expanding a multi-vehicle search. Other search algorithms like visibility graph-based, DIJKSTRA, neural networks, or even simplex methods can be used.

Thus, it is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

The embodiments of the invention in which an exclusive property or privilege is claimed are defined as follows:

1. A method for robotic swarm localization using ranging sensors, comprising the steps of:
   providing a group of four or more moving platforms;
   maintaining a stationary position by at least three of the moving platforms from the group of four or more moving platforms at any given time;
   each moving platform having inertial components that are localized by:
      measuring the distance between the moving platforms using ranging sensors; and
      receiving a stationary position reference from at least three platforms from the group at any given time; and
   maintaining an accurate positioning of the group of platforms, by maintaining at least three stationary platforms from the group of platforms;
   providing at least three stationary position references from the stationary platforms to the inertial components for localization on each of the moving platforms;
   creating an ad hoc localization structure;
   moving the platforms into position by utilizing the stationary platforms;
   determining when a navigation unit of a platform is not moving;
   determining when the platform is immobile and no acceleration is present when immobile and stationary;
   computing acceleration biases to provide a zero velocity update to the navigation unit of the platform;
   determining if at least three or more platforms from the group are not moving and are stationary, and
   computing the position of the moving platforms by triangulating the position of at least three stationary platforms.

2. The method for robotic swarm localization of claim 1, wherein
   the ranging sensors are ranging radios;
   the ranging radios measure the distance between the robotic platforms; and
   determining a swarm movement methodology for maintaining relative and absolute localization of the group.

3. The method for robotic swarm localization of claim 2, wherein the ranging radios include
   electromagnetic waves with active or passive responses;
   LADAR;
   vision against known features in the moving platform; and
   acoustic sensors.

4. The method for robotic swarm localization of claim 1, wherein one or more ranging sensors provide a point-to-point measurement between the platforms.

5. The method for robotic swarm localization of claim 1, further comprising the step of
   computing the localization using a combination of the ranging sensor data and other sensors and corresponding data in the moving platform.

6. The method for robotic swarm localization of claim 5, wherein the other sensors include one or more of the following sensors:
   inertial sensor;
   altimeter;
   compass; and
   pressure sensor.

7. The method for robotic swarm localization of claim 1, wherein the number of platforms maintaining a stationary position is more than three, to increase the localization space or accuracy of results.

8. The method for robotic swarm localization of claim 1, wherein the platforms maintaining a stationary position are located on the ground.

9. The method for robotic swarm localization of claim 1, further comprising the steps of
traversing an area where stationary and moving platforms exchange functionality;
one or more of the stationary platforms become moving platforms; and
one or more of the moving platforms become stationary as long as at least three platforms are maintained stationary at any given time.

10. The method for robotic swarm localization of claim 1, further comprising the step of
controlling the size of one or more zero velocity updates to match a drift of one or more accelerometers which comprise the inertial components.

11. The method for robotic swarm localization of claim 1, further comprising the step of
optimizing a topology of the platforms or sensors left stationary as to minimize an error propagation of this swarm by using an algorithm to search for the most effective topology with respect to the different error propagation generated by the swarm to optimize the topology and therefore minimize the error in localization.

12. The method for robotic swarm localization of claim 1, wherein
the swarm is composed of either or ground, underwater, surface, or flying platforms.

13. The method for robotic swarm localization of claim 12, wherein
the platforms can be manned or unmanned.

* * * * *